United States Patent [19]

Teguri et al.

[11] Patent Number: 5,490,067
[45] Date of Patent: Feb. 6, 1996

[54] TRIGGER DEVICE FOR VEHICLE SAFETY APPARATUS

[75] Inventors: Yoshihiko Teguri; Seiya Ide, both of Okazaki, Japan

[73] Assignee: Nippondenso Co., Ltd., Kariya, Japan

[21] Appl. No.: 893,800

[22] Filed: Jun. 4, 1992

[30] Foreign Application Priority Data

Jun. 4, 1991 [JP] Japan .................... 3-132786

[51] Int. Cl.$^6$ ................................. B60R 21/32
[52] U.S. Cl. ............... 364/424.05; 340/436; 280/735; 180/282
[58] Field of Search ............ 364/424.05; 180/274, 180/282; 280/734, 735; 307/10.1; 340/436, 438, 669

[56] References Cited

U.S. PATENT DOCUMENTS

| | | | |
|---|---|---|---|
| 3,762,495 | 10/1973 | Usui et al. | 180/282 |
| 4,975,850 | 12/1990 | Diller | 364/424.05 |
| 4,985,835 | 1/1991 | Sterler et al. | 280/735 |
| 4,994,972 | 2/1991 | Diller | 364/424.05 |
| 5,068,793 | 11/1991 | Condne et al. | 280/735 |
| 5,189,311 | 2/1993 | Moriyama et al. | 364/424.05 |
| 5,208,484 | 5/1993 | Okano et al. | 180/274 |

FOREIGN PATENT DOCUMENTS

| | | |
|---|---|---|
| 59-8574 | 2/1984 | Japan. |
| 3114944 | 5/1991 | Japan. |

Primary Examiner—Gary Chin
Attorney, Agent, or Firm—Cushman, Darby & Cushman

[57] ABSTRACT

A trigger device for a vehicle safety apparatus includes an acceleration sensor for detecting an acceleration of a vehicle and generating an electric acceleration signal representative thereof, an integration section for integrating the acceleration signal during each given integration period and generating an integration value representative of a result of the integrating, a determination section for determining whether or not a collision of the vehicle is present on the basis of the integration value generated by the integration section, and a trigger section for triggering the vehicle safety apparatus when the determination section determines a collision of the vehicle to be present. The determination section includes a differentiator for detecting a differential value of the acceleration signal which occurs at a given moment in the integration period, an adder for adding the differential value detected by the differentiator and the integration value generated by the integration section, and for generating an addition value representative of a result of the adding, and a sub-determination section for determining whether or not a collision of the vehicle is present on the basis of the addition value generated by the adder.

23 Claims, 7 Drawing Sheets

TRIGGER DEVICE FOR VEHICLE SAFETY APPARATUS

BACKGROUND OF THE INVENTION

1. Field of the Invention

This invention relates to a trigger device for a vehicle safety apparatus such as a vehicle air bag apparatus.

2. Description of the Prior Art

Japanese published examined patent application 59-8574 discloses an air bag trigger control apparatus in which the speed of the related vehicle is derived from a vehicle acceleration signal by an integrating process. In the apparatus of Japanese application 59- 8574, when an integration value corresponding to the derived vehicle speed exceeds a given value, a related air bag is triggered. Generally, vehicle collisions are of various types, such as a head-on type, an oblique type, a pole-against type (a collision against a pole), and an offset type. During a collision of the vehicle, the acceleration of the vehicle varies in a manner which depends on the type of the collision. In the apparatus of Japanese application 59-8574, it is generally difficult to accurately and promptly detect vehicle collisions of some of the types.

Japanese published unexamined patent application 3-114944 discloses an air bag control apparatus in which a signal representing the acceleration of a related vehicle is processed to detect a collision of the vehicle. In the apparatus of Japanese application 3- 114944, a quantity of a variation of the speed of the vehicle is calculated by integrating the vehicle acceleration signal, and a collision of the vehicle is detected on the basis of information representing the vehicle speed variation quantity and also information representing the difference between maximal and minimal values of the acceleration of the vehicle. The apparatus of Japanese application 3-114944 does not consider a differential of the vehicle acceleration signal in detecting a collision of the vehicle. Therefore, in the apparatus of Japanese application 3-114944, it is generally difficult to discriminate between a head-on collision and a rear-end collision. In addition, it is difficult to accurately and promptly detect vehicle collisions of some of the types.

U.S. Pat. No. 3,762,495 discloses a device for triggering a motor vehicle safety apparatus. When the related motor vehicle collides with another object, the device of U.S. Pat. No. 3,762,495 detects the impact between the motor vehicle and the other object and supplies a triggering signal to the safety apparatus in accordance with both the magnitude of deceleration resulting from the impact and the rate of the deceleration. The device of U.S. Pat. No. 3,762,495 does not integrate a vehicle acceleration signal for the detection of the collision between the motor vehicle and the other object. Accordingly, in the device of U.S. Pat. No. 3,762,495, it is generally difficult to accurately and promptly detect vehicle collisions of some of the types.

U.S. Pat. No. 4,994,972 discloses an apparatus for actuating a passenger restraint system in a passenger vehicle. In the apparatus of U.S. Pat. No. 4,994,972, a sensor senses vehicle deceleration and provides a deceleration signal having a value which varies in accordance therewith, and a plurality of crash evaluation circuits each respond to the deceleration signal for evaluating the deceleration signal in accordance with respectively different crash evaluation algorithms. Each evaluation circuit provides a vote signal when its evaluation of the deceleration signal indicates that the restraint system should be actuated. The vote signals are summed to provide a summation signal. The summation signal has a fractional value dependent upon the ratio of the number of vote signals to the total number of evaluation votes. The restraint system is actuated when the summation signal exceeds a threshold level. In the apparatus of U.S. Pat. No. 4,994,972, the value of an integral of the deceleration signal and the value of a differential of the deceleration signal are used for the generation of the vote signals. Specifically, the value of an integral of the deceleration signal is compared with a given value for the generation of the related vote signal while the value of a differential of the deceleration signal is compared with a given value for the generation of the related vote signal. The apparatus of U.S. Pat. No. 4,994,972 considers the value of a differential of the deceleration signal which occurs at the present moment, but does not consider the value of a differential of the deceleration signal which occurs before the present moment. Accordingly, in the apparatus of U.S. Pat. No. 4,994,972, it tends to be difficult to accurately and promptly detect vehicle collisions of some of the types.

SUMMARY OF THE INVENTION

It is an object of this invention to provide an improved trigger device for a vehicle safety apparatus such as a vehicle air bag apparatus.

A first aspect of this invention provides a trigger device for a vehicle safety apparatus which comprises an acceleration sensor for detecting an acceleration of a vehicle and generating an electric acceleration signal representative thereof, integration means for integrating the acceleration signal during each given integration period and generating an integration value representative of a result of the integrating, determination means for determining whether or not a collision of the vehicle is present on the basis of the integration value generated by the integration means, and trigger means for triggering the vehicle safety apparatus when the determination means determines a collision of the vehicle to be present, the improvement wherein the determination means comprises differentiation means for detecting a differential value of the acceleration signal which occurs at a given moment in the integration period; addition means for adding the differential value detected by the differentiation means and the integration value generated by the integration means, and for generating an addition value representative of a result of the adding; and sub-determination means for determining whether or not a collision of the vehicle is present on the basis of the addition value generated by the addition means.

A second aspect of this invention provides a trigger device for a vehicle safety apparatus which comprises an acceleration sensor for detecting an acceleration of a vehicle and generating an electric acceleration signal representative thereof; integration means for integrating the acceleration signal during each given integration period and generating an integration value representative of a result of the integrating; first differentiation means for detecting a first differential value of the acceleration signal which occurs at a first moment in the integration period; second differentiation means for detecting a second differential value of the acceleration signal which occurs at a second moment in the integration period, the second moment being different from the first moment; first addition means for adding the integration value generated by the integration means and the first differential value detected by the first differentiation means, and for generating a first addition value representative of a result of the adding; second addition means for adding the integration value generated by the integration means and the second differential value detected by the second differentiation means, and for generating a second addition value representative of a result of the adding; first determination means for comparing the first addition value generated by the first addition means with a first reference value to determine whether or not a collision of the vehicle is present; second determination means for comparing the second addition value generated by the second addition means with a second reference value to determine whether or not a collision of the vehicle is present; and trigger means for triggering the vehicle safety apparatus when at least one of the first determination means and the second determination means determines a collision of the vehicle to be present.

A third aspect of this invention provides a trigger device for a vehicle safety apparatus which comprises an acceleration sensor for detecting an acceleration of a vehicle and generating an electric acceleration signal representative thereof; a microcomputer for processing the acceleration signal and determining whether or not a collision of the vehicle is present on the basis of a result of the processing; and trigger means for triggering the vehicle safety apparatus when the microcomputer determines a collision of the vehicle to be present; wherein the microcomputer comprises integration means for integrating the acceleration signal during each given integration period and generating an integration value representative of a result of the integrating, first differentiation means for detecting a first differential value of the acceleration signal which occurs at a first moment in the integration period, second differentiation means for detecting a second differential value of the acceleration signal which occurs at a second moment in the integration period, the second moment being different from the first moment, first addition means for adding the integration value generated by the integration means and the first differential value detected by the first differentiation means, and for generating a first addition value representative of a result of the adding, second addition means for adding the integration value generated by the integration means and the second differential value detected by the second differentiation means, and for generating a second addition value representative of a result of the adding, first determination means for comparing the first addition value generated by the first addition means with a first reference value to determine whether or not a collision of the vehicle is present, and second determination means for comparing the second addition value generated by the second addition means with a second reference value to determine whether or not a collision of the vehicle is present.

A fourth aspect of this invention provides a trigger device for a vehicle safety apparatus which comprises an acceleration sensor for detecting an acceleration of a vehicle and generating an electric acceleration signal representative thereof; integration means for integrating the acceleration signal and generating an integration value representative of a result of the integrating; first differentiation means for detecting a first value of a differential of the acceleration signal which occurs at a first moment; second differentiation means for detecting a second value of a differential of the acceleration signal which occurs at a second moment, the second moment preceding the first moment; determination means for determining whether or not a collision of the vehicle is present on the basis of the integration value generated by the integrating means, the first differential value detected by the first differentiation means, and the second differential value detected by the second differentiation means; and trigger means for triggering the vehicle safety apparatus when the determination means determines a collision of the vehicle to be present.

DESCRIPTION OF THE FIRST PREFERRED EMBODIMENT

Figure 1:
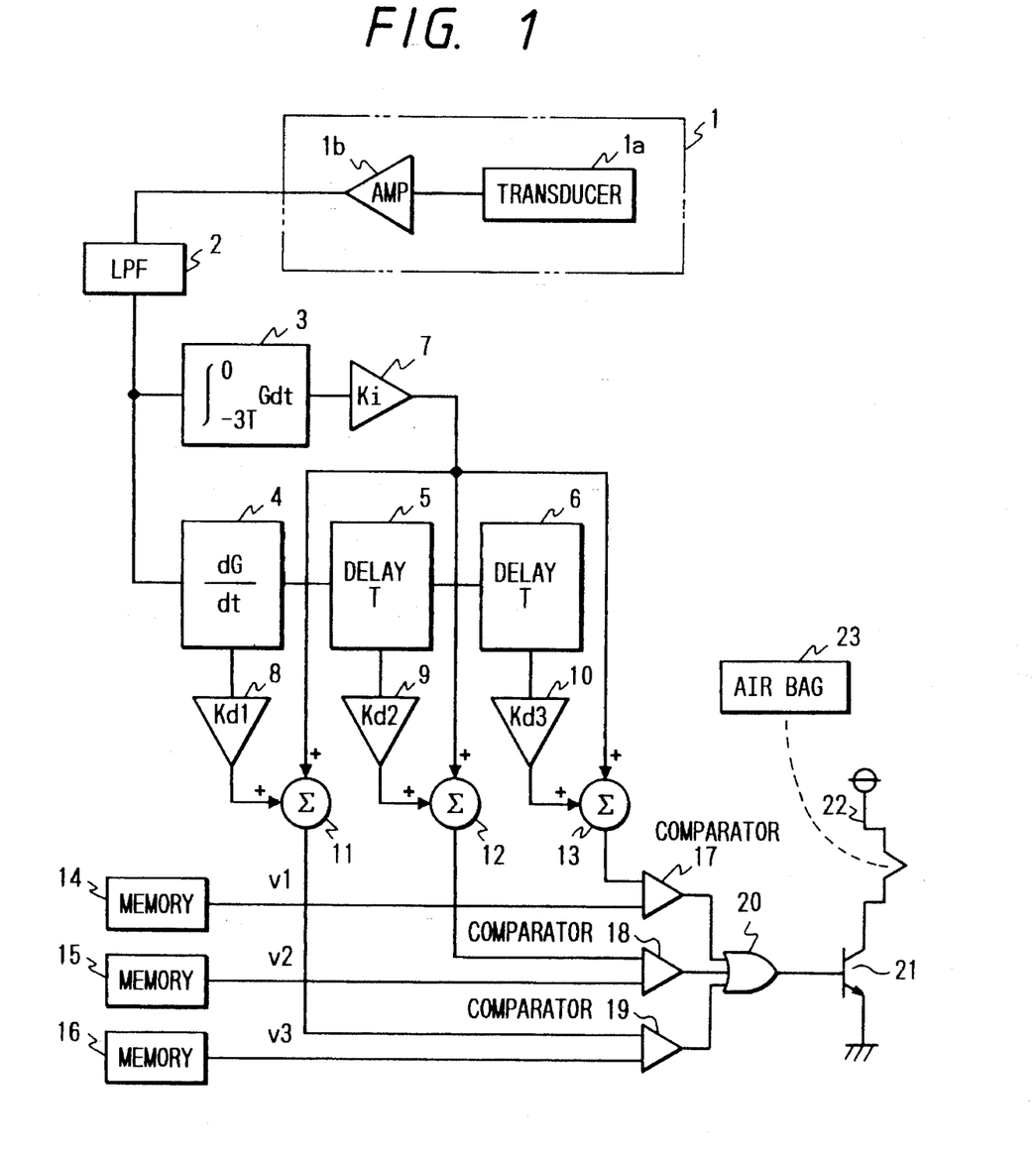
FIG. 1 is a block diagram of a trigger device for a vehicle safety apparatus according to a first embodiment of this invention.

With reference to FIG. 1, an acceleration sensor 1 mounted on a vehicle (not shown) detects the acceleration or deceleration of the vehicle and outputs an acceleration signal representative thereof. It should be noted that a deceleration is equal to the result of inverting the sign of an acceleration. The acceleration sensor 1 includes a transducer 1a and an amplifier 1b. The transducer 1a outputs an electric signal representing the acceleration of the vehicle. The amplifier 1b enlarges the output signal of the transducer 1a.

The acceleration signal is fed from the acceleration sensor 1 to an integrating circuit 3 and a differentiating circuit 4 via a low pass filter 2. High-frequency noise components are removed from the acceleration signal by the low pass filter 2.

The integrating circuit 3 integrates the received acceleration signal for a given interval equal to 3T seconds where T denotes a given value. The integrating circuit 3 generates an integration signal representative of an integration value equal to the result of the integration. The integrating circuit 3 outputs the integration signal to a multiplier 7. The multiplier 7 multiplies the integration value by a given coefficient Ki, and generates another integration signal representing the result of the multiplication. The multiplier 7 outputs the integration signal to first input terminals of adding circuits 11, 12, and 13.

The differentiating circuit 4 calculates the average of values of differentials (derivatives) of the received acceleration signal which occur during a given last interval equal to T seconds extending up to the present moment. The average differential value calculated by the differentiating circuit 4 is referred to as the current average differential value. The averaging process executed by the differentiating circuit 4 removes unwanted noise components from the output signal of the differentiating circuit 4. Specifically, the averaging process includes the step of deriving differential values at respective moments, and the step of arithmetically averaging the derived differential values. Alternatively, the averaging process may include the step of dividing the given last interval into a former part and a latter part, the step of deriving integral values for the former part and the latter part respectively, the step of calculating the difference between the derived integral values, and the step of calculating an average differential value from the calculated difference.

As described previously, vehicle collisions are of various types, such as a head-on type, an oblique type, a pole-against type (a collision against a pole), and an offset type. FIGS. 2(a), 2(b), 2(c), and 2(d) show examples of time-domain variations in the level of the acceleration signal which occur in the case of a head-on collision, an oblique collision, a pole-against collision, and an offset collision respectively. In each of FIGS. 2(a), 2(b), 2(c), and 2(d), the ordinate denotes the level of the acceleration signal which corresponds to the acceleration or deceleration of the vehicle, and the origin "O" corresponds to the moment of the occurrence of a collision. As shown in FIGS. 2(a), 2(b), 2(c), and 2(d), during a collision, the level of the acceleration signal varies in a manner which depends on the type of the collision. To enable accurate and prompt detection or determination of a collision independent of the type thereof, previous average differential values are also considered as follows.

The differentiating circuit 4 outputs the differentiation signal representative of the current average differential value to a delay circuit 5 and a multiplier 8. The delay circuit 5 delays the output signal of the differentiating circuit 4 by a given period equal to T seconds, thereby outputting a differentiation signal representative of an average differential value which occurs at a moment preceding the present moment by the given period equal to T seconds. The average differential value represented by the output signal from the delay circuit 5 is referred to as the T-previous average differential value. The output signal from the delay circuit 5 is fed to a delay circuit 6 and a multiplier 9. The delay circuit 6 delays the output signal of the delay circuit 5 by a given period equal to T seconds, thereby outputting a differentiation signal representative of an average differential value which occurs at a moment preceding the present moment by the given period equal to 2T seconds. The average differential value represented by the output signal from the delay circuit 6 is referred to as the 2T-previous average differential value.

The multiplier 8 receives the differentiation signal representing the current average differential value. The multiplier 8 multiplies the current average differential value by a given coefficient Kd1, and generates another differentiation signal representing the result of the multiplication. The multiplier 8 outputs the differentiation signal to a second input terminal of the adding circuit 11. The multiplier 9 receives the differentiation signal representing the T-previous average differential value. The multiplier 9 multiplies the T-previous average differential value by a given coefficient Kd2, and generates another differentiation signal representing the result of the multiplication. The multiplier 9 outputs the differentiation signal to a second input terminal of the adding circuit 12. The multiplier 10 receives the differentiation signal representing the 2T-previous average differential value. The multiplier 10 multiplies the 2T-previous average differential value by a given coefficient Kd3, and generates another differentiation signal representing the result of the multiplication. The multiplier 10 outputs the differentiation signal to a second input terminal of the adding circuit 13.

The adding circuit 11 adds the integration signal output from the multiplier 7 and the differentiation signal output from the multiplier 8, and generates an addition signal representing the result of the addition. The adding circuit 11 outputs the addition signal to a first input terminal of a comparing circuit 19. The adding circuit 12 adds the integration signal output from the multiplier 7 and the differentiation signal output from the multiplier 9, and generates an addition signal representing the result of the addition. The adding circuit 12 outputs the addition signal to a first input terminal of a comparing circuit 18. The adding circuit 13 adds the integration signal output from the multiplier 7 and the differentiation signal output from the multiplier 10, and generates an addition signal representing the result of the addition. The adding circuit 13 outputs the addition signal to a first input terminal of a comparing circuit 17.

The coefficients Ki, Kd1, Kd2, and Kd3 used in the multipliers 7, 8, 9, and 10 are weights predetermined according to the type of the vehicle. When the multipliers 8, 9, and 10 are modified so as to use coefficients corresponding to values of Kd1/Ki, Kd2/Ki, and Kd3/Ki, the multiplier 7 can be omitted.

A memory 14 holds a signal representing a given threshold value V1. The memory 14 outputs the threshold value signal to a second input terminal of the comparing circuit 17. A memory 15 holds a signal representing a given threshold value V2. The memory 15 outputs the threshold value signal to a second input terminal of the comparing circuit 18. A memory 16 holds a signal representing a given threshold value V3. The memory 16 outputs the threshold value signal to a second input terminal of the comparing circuit 19.

The comparing circuit 17 compares the value represented by the output signal from the adding circuit 13 with the threshold value V1. The threshold value V1 is chosen so as to enable the comparing circuit 17 to detect an oblique collision. When the value represented by the output signal from the adding circuit 13 exceeds the threshold value V1, that is, when the occurrence of an oblique collision or another collision is detected, the comparing circuit 17 outputs a high-level signal to a first input terminal of an OR circuit 20. Otherwise the comparing circuit 17 outputs a low-level signal to the first input terminal of the OR circuit 20. The comparing circuit 18 compares the value represented by the output signal from the adding circuit 12 with the threshold value V2. The threshold value V2 is chosen so as to enable the comparing circuit 18 to detect an offset collision. When the value represented by the output signal from the adding circuit 12 exceeds the threshold value V2, that is, when the occurrence of an offset collision or another collision is detected, the comparing circuit 18 outputs a high-level signal to a second input terminal of the OR circuit 20. Otherwise, the comparing circuit 18 outputs a low-level signal to the second input terminal of the OR circuit 20. The comparing circuit 19 compares the value represented by the output signal from the adding circuit 11 with the threshold value V3. The threshold value V3 is chosen so as to enable the comparing circuit 19 to detect a pole-against collision. When the value represented by the output signal from the adding circuit 11 exceeds the threshold value V3, that is, when the occurrence of a pole-against collision or another collision is detected, the comparing circuit 19 outputs a high-level signal to a third input terminal of the OR circuit 20. Otherwise, the comparing circuit 19 outputs a low-level signal to the third input terminal of the OR circuit 20.

The output terminal of the OR circuit 20 is connected to the base of a switching transistor 21. A squib 22 is electrically connected to a power supply via the collector-emitter path of the switching transistor 21. The squib 22 serves to fire an explosive (not shown) to inflate an air bag 23. When a drive current or a trigger current is supplied to the squib 22, the squib 22 is activated so that the air bag 23 is inflated.

In cases where at least one of the comparing circuits 17, 18, and 19 outputs a high-level signal, the high-level signal passes through the OR circuit 20 and then reaches the base of the switching transistor 21. The high-level signal reaching the switching transistor 21 turns on the switching transistor 21, so that a trigger current is supplied to the squib 22 from the power supply. Thus, the squib 22 is activated, and the air bag 23 is inflated. In cases where all the comparing circuits 17, 18, and 19 output low-level signals, the OR circuit 20 outputs a low-level signal to the base of the switching transistor 21 so that the switching transistor 21 is kept in an off state. Thus, the squib 22 remains inactive.

Figure 2A:
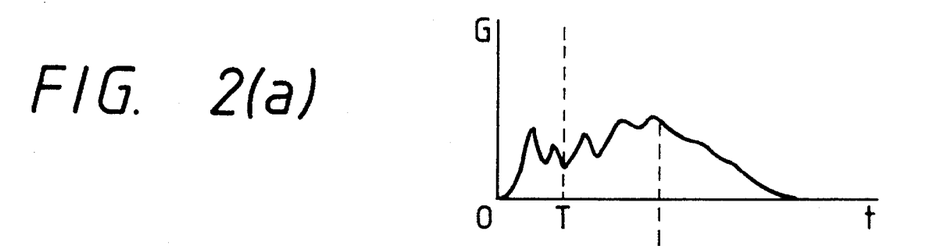
FIGS. 2(a), 2(b), 2(c), and 2(d) are time-domain diagrams showing examples of the waveform of an acceleration signal which occur in the case of collisions of different types respectively.

In the case of a head-on collision, as shown in FIG. 2(a), the acceleration of the vehicle greatly increases immediately after the occurrence of the collision. Accordingly, at a moment which follows the moment of the occurrence of the collision by an interval equal to T seconds, the occurrence of the collision can be detected on the basis of the current average differential value generated by differentiating circuit 4.

Figure 2B:
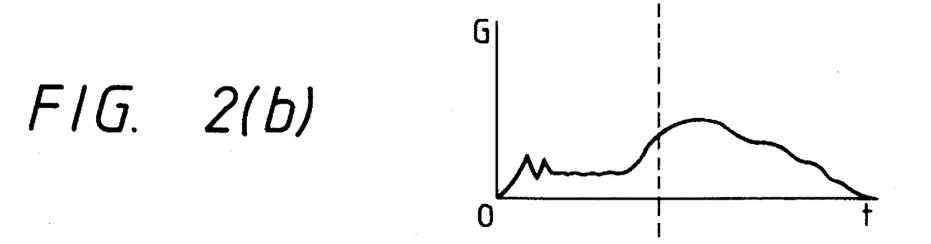

In the case of an oblique collision, as shown in FIG. 2(b), the acceleration of the vehicle appreciably increases immediately after the occurrence of the collision, and then increases again. Accordingly, the occurrence of the collision can be detected on the basis of the 2T-previous average differential value generated by the delay circuit 6 and the integration value generated by the integrating circuit 3.

Figure 2C:
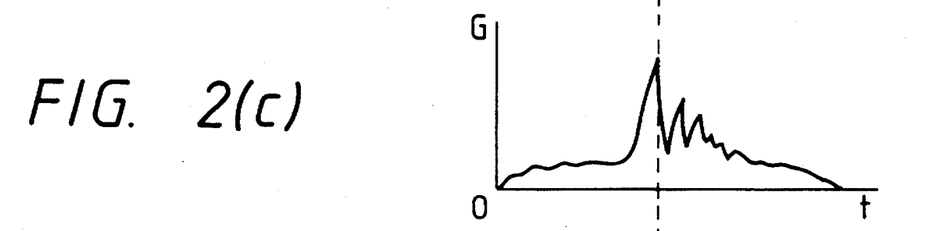

In the case of a pole-against collision, as shown in FIG. 2(c), the acceleration of the vehicle does not increase abruptly during a certain period subsequent to the moment of the occurrence of the collision, and then greatly increases. Accordingly, the occurrence of the collision can be detected on the basis of the current average differential value generated by the differentiating circuit 4 and the integration value generated by the integrating circuit 3.

Figure 2D:
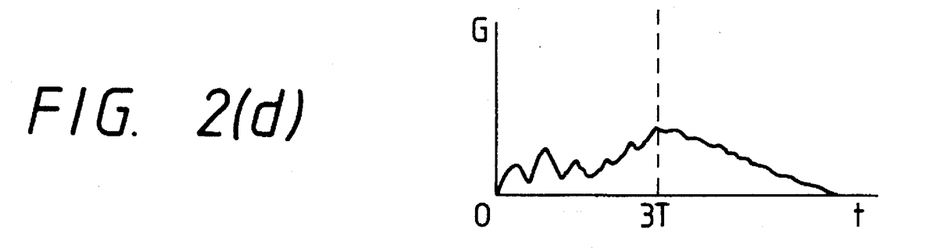

In the case of an offset collision, as shown in FIG. 2(d), the acceleration of the vehicle abruptly increases a short-period after the moment of the occurrence of the collision, and then gradually increases. Accordingly, the occurrence of the collision can be detected on the basis of the T-previous average differential value generated by the delay circuit 5 and the integration value generated by the integrating circuit 3.

As described previously, the acceleration signal is integrated by the integrating circuit 3 for the given integration period equal to 3T seconds, and thereby the integration value is generated. The integration period is equally divided into three portions, that is, the oldest portion, the intermediate portion, and the latest portion. The oldest portion of the integration period corresponds to the 2T-previous average differential value generated by the delay circuit 6. The intermediate portion of the integration period corresponds to the T-previous average differential value generated by the delay circuit 5. The latest portion of the integration period corresponds to the current average differential value generated by the differentiating circuit 4. By processing and analyzing combinations of the integration value with the current average differential value, the T-previous average differential value, and the 2T-previous average differential value, it is possible to accurately detect the occurrences of collisions of various types with good response characteristics.

While the three average differential values are calculated for each integration period in this embodiment, the number of the average differential values may be different from three.

While the air bag is used as a safety apparatus in this embodiment, a seat belt passively actuated via a squib may be used as a safety apparatus. In addition, a combination of the air bag and the seat belt may be used as a safety apparatus.

DESCRIPTION OF THE SECOND PREFERRED EMBODIMENT

Figure 3:
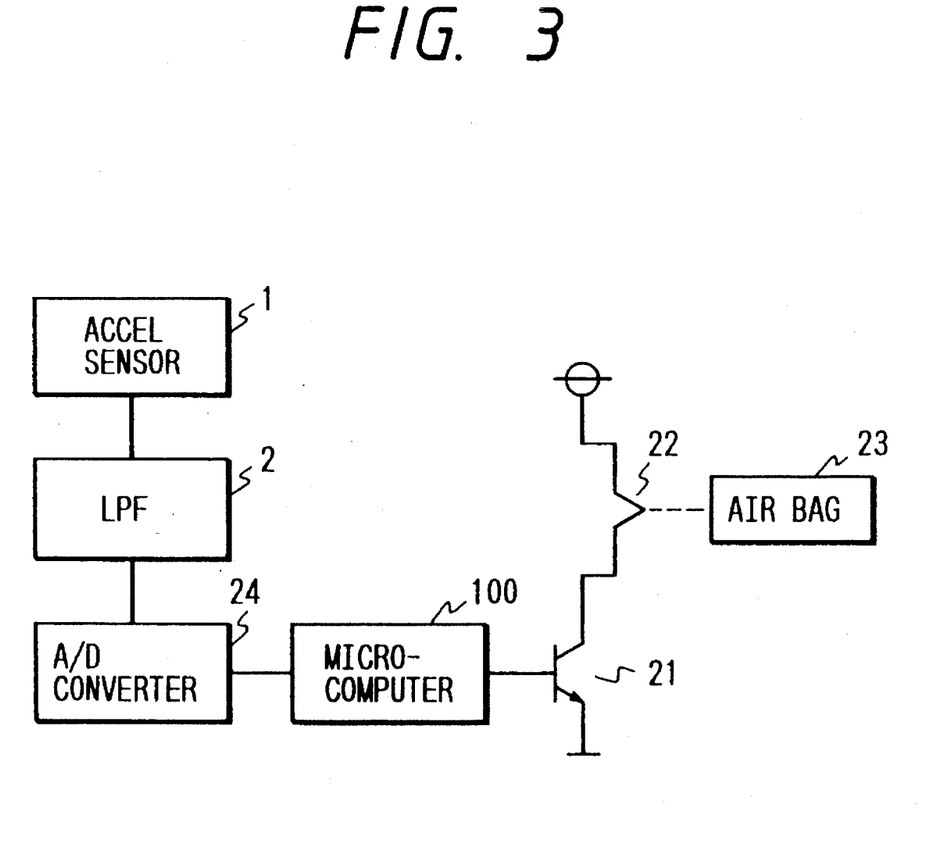
FIG. 3 is a block diagram of a trigger device for a vehicle safety apparatus according to a second embodiment of this invention.

With reference to FIG. 3, an acceleration sensor 1 mounted on a vehicle (not shown) detects the acceleration or deceleration of the vehicle and outputs an acceleration signal representative thereof. It should be noted that a deceleration is equal to the result of inverting the sign of an acceleration.

The acceleration signal is fed from the acceleration sensor 1 to an analog-to-digital (A/D) converter 24 via a low pass filter 2. High-frequency noise components are removed from the acceleration signal by the low pass filter 2. The acceleration signal is converted into a corresponding digital acceleration signal by the A/D converter 24. The A/D converter 24 outputs the digital acceleration signal to a microcomputer 100.

The microcomputer 100 is connected to the base of a switching transistor 21. A squib 22 is electrically connected to a power supply via the collector-emitter path of the switching transistor 21. The squib 22 serves to fire an explosive (not shown) to inflate an air bag 23. When a drive current or a trigger current is supplied to the squib 22, the squib 22 is activated so that the air bag 23 is inflated.

The microcomputer 100 processes the digital acceleration signal to detect the occurrence of a collision of the vehicle. When the microcomputer 100 detects the occurrence of a collision of the vehicle, the microcomputer 100 outputs a high-level signal to the base of the switching transistor 21. The high-level signal turns on the switching transistor 21, so that a trigger current is supplied to the squib 22 from the power supply. Thus, the squib 22 is activated, and the air bag 23 is inflated. In cases where the occurrence of a collision of the vehicle remains undetected, the microcomputer 100 continues to output a low-level signal to the base of the switching transistor 21 so that the switching transistor 21 is kept in an off state. Thus, the squib 22 remains inactive.

The microcomputer 100 includes a combination of an I/O port, a processing section, a ROM, and a RAM. The microcomputer 100 operates in accordance with a program stored in the ROM.

Figure 4:
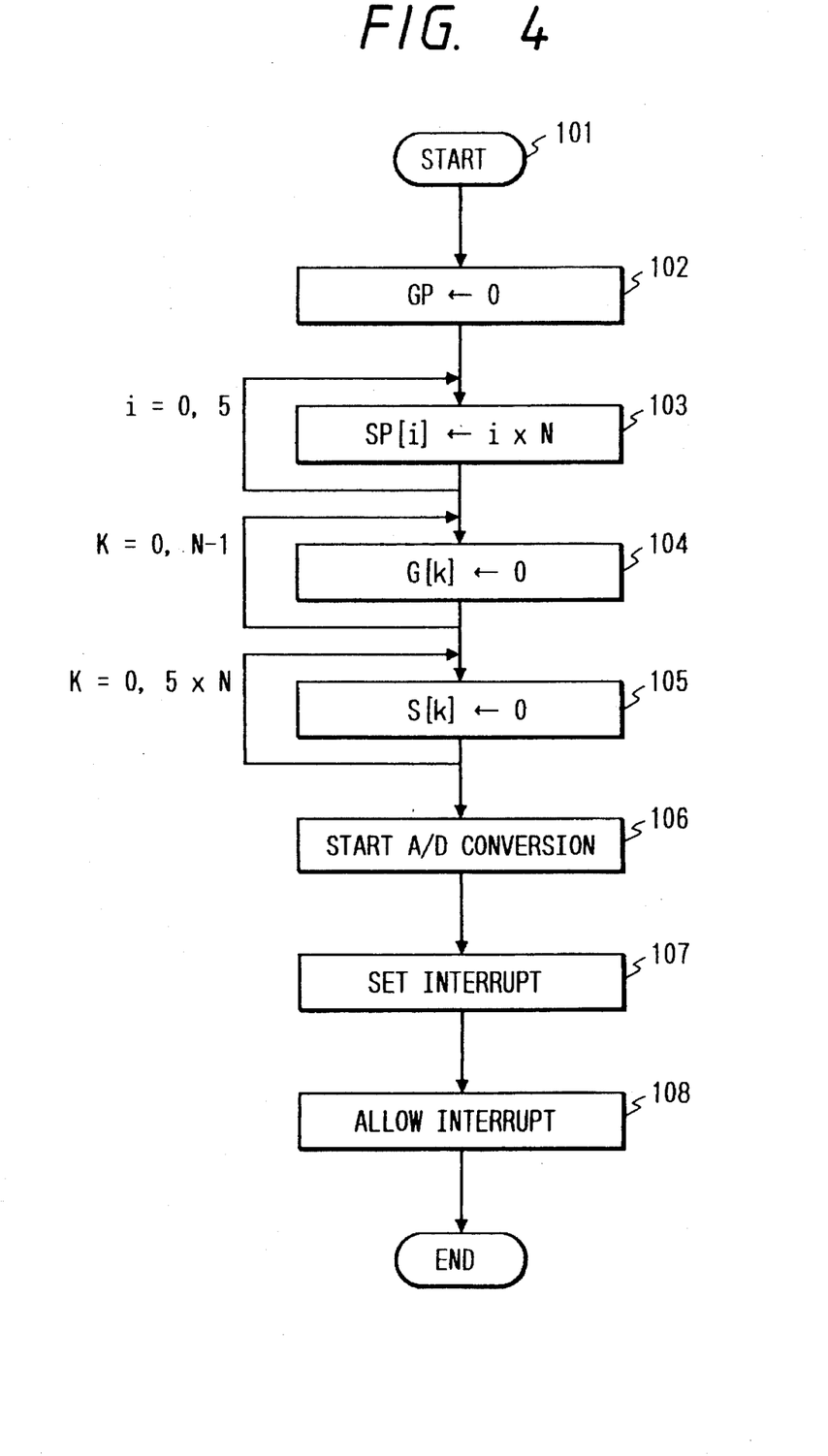
FIG. 4 is a flowchart of a program for controlling the microcomputer of FIG. 3.

When a vehicle key switch (not shown) is moved to an on position, the electric devices shown in FIG. 3 are powered by a vehicle battery (not shown) and the microcomputer 100 starts to operate in accordance with the program. FIG. 4 is a flowchart of the program.

As shown in FIG. 4, the program starts at a step 101 and then advances to a first step 102 which initializes a pointer (variable) GP to 0. The pointer GP corresponds to an array G for memorizing an acceleration waveform in the RAM. After the step 102, the program advances to a step 103.

Figure 8:
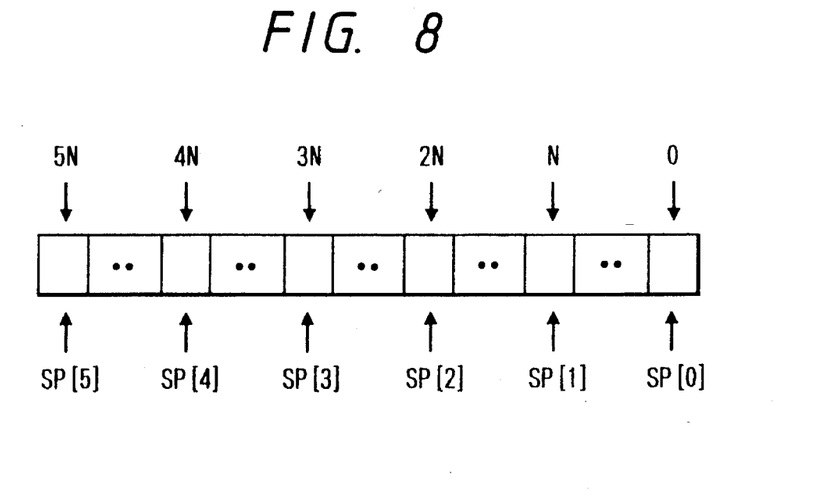
FIG. 8 is a diagram showing the structure of integration-value memorizing array.
Figure 9:
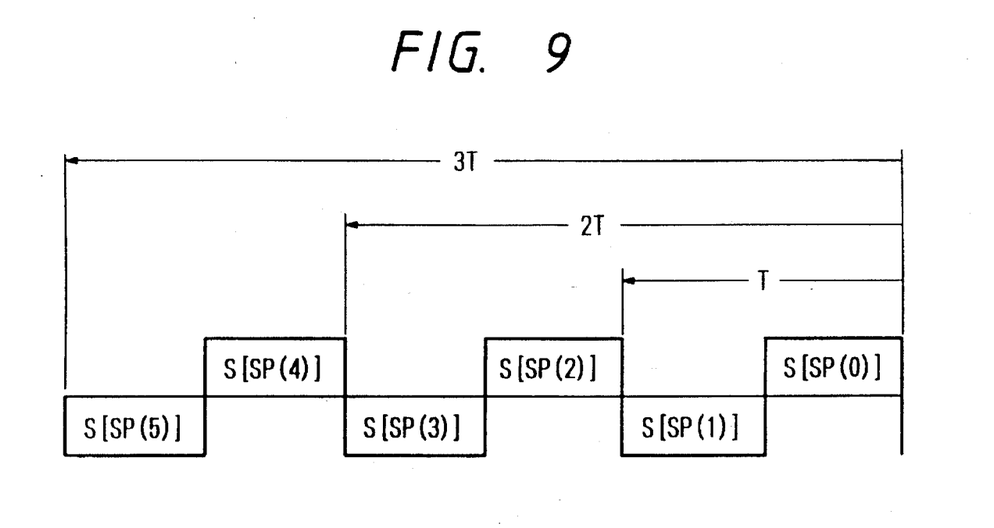
FIG. 9 is a diagram showing conditions of the division of an integration period which is executed for generating differentiation data.

A step 103 following the step 102 initializes pointers SP[i] to i×N, where i=1, 2, 3, 4, and 5, and N is a variable denoting a given natural number. The pointers SP[i] correspond to an array S for memorizing integration values in the RAM. The pointers SP[i] denote six elements SP[0], SP[1], SP[2], SP[3], SP[4], and SP[5] of the memorizing array S which are spaced at equal intervals corresponding to N as shown in FIG. 8.

A step 104 following the step 103 initializes all elements of the acceleration-waveform memorizing array G to 0. A step 105 following the step 104 initializes all elements of the integration-value memorizing array S. It should be noted that the elements of the array G are denoted by G[0], G[1], ..., G[N−1] and the total number of the elements of the array G is equal to N. In addition, the elements of the array S are denoted by S[0], ..., S[5N] as shown in FIG. 8, and the total number of the elements of the array S is equal to 5×N+1.

A step 106 following the step 105 outputs an instruction to the A/D converter 24 so that the A/D converter 24 should start the A/D conversion. As a result, the A/D converter 24 executes the A/D conversion of the acceleration signal.

A step 107 following the step 106 executes the settings for an interruption routine. A step 108 following the step 107 gives an allowance of a timer-based interruption process. As a result, the timer-based interruption process is periodically executed at a given period "h". The given period "h" is set equal to T/2N where T denotes a given value. The time of one conversion process in the A/D converter 24 is set shorter than the given period "h". After the step 108, the program ends.

Figure 5:
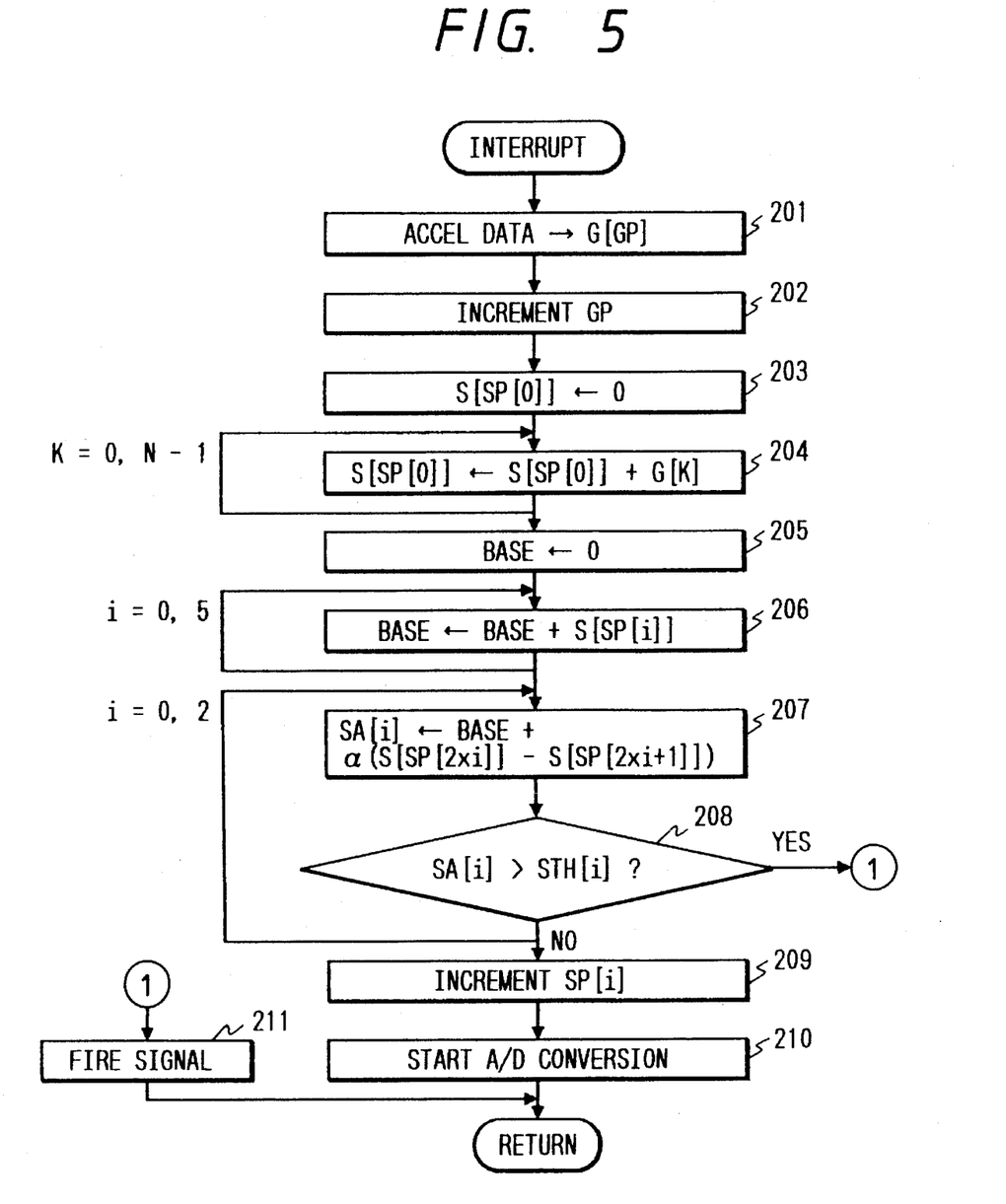
FIG. 5 is a flowchart of a timer-based interruption process.

FIG. 5 is a flowchart of the timer-based interruption process allowed by the step 108 of FIG. 4. As shown in FIG. 5, a first step 201 of the interruption process receives the digital acceleration signal or the acceleration data from the A/D converter 24. The step 201 stores the received acceleration data into a region of the acceleration-waveform memorizing array G which is designated by the pointer GP. The acceleration data stored in the region designated by the pointer GP is denoted by G[GP]. A step 202 following the step 201 increments the pointer GP by 1 to make preparations for storing subsequent acceleration data. As a result, an N number of latest acceleration data are stored into the respective regions of the acceleration-waveform memorizing array G.

A step 203 following the step 202 sets integration data to 0, the integration data being in a region of the integration-value memorizing array S which is designated by the pointer SP[0]. The integration data stored in the region designated by the pointer SP[0] is denoted by S[SP[0]].

A step 204 following the step 203 adds the acceleration data G[0], ..., G[N−1], and sets the new integration data S[SP[0]] equal to the result of the addition. In this way, the step 204 updates the integration data S[SP[0]]. Thus, an N number of the integration values of the latest acceleration data are denoted by S[SP[0]]. The N number of the integration values mean the integration values of the acceleration data in a time equal to T/2 seconds. Since the related pointer SP[0] is incremented by a step 209 as will be described later, a 5N+1 number of the latest integration values are stored in the integration-value memorizing array S.

A step 205 following the step 204 sets integration data BASE to 0. The integration data BASE represents an integration value which results from integration for a given period equal to 3T seconds. A step 206 following the step 205 adds the data S[SP[0]], ..., S[SP[5]], and sets the new integration data BASE equal to the result of the addition. In this way, the step 206 updates the integration data BASE, and the final integration data BASE represents an integration value which is equal to the result of integrating the acceleration data for the given period equal to 3T seconds (3T=6×T/2). The integration data BASE corresponds to the output signal from the integrating circuit 3 of FIG. 1.

A step 207 following the step 206 calculates a current differential (derivative) value, a T-previous differential (derivative) value which occurs at a moment preceding the present moment by a given period equal to T seconds, and a 2T-previous differential (derivative) value which occurs at a moment preceding the present moment by a given period equal to 2T seconds. The current differential value, the T-previous differential value, and the 2T-previous differential value correspond to the output signals from the differentiating circuit 4, the delay circuit 5, and the delay circuit 6 of FIG. 1 respectively. The step 207 adds the integration data BASE and the differentiation data representing the current differential value, the T-previous differential value, and the 2T-previous differential value, and thereby generates differentiation/integration data SA[i] on the basis thereof. To generate the differentiation data, each of the T-second periods is divided into haves (T/2-periods) and an approximate average differential value is calculated from the difference between the integration values corresponding to the respective halves. The current differential value is given by S[SP[0]]−S[SP[1]]. The T-previous differential value is given by S[SP[2]]−S[SP[3]]. The 2T-previous differential value is given by S[SP[4]]−S[SP[5]]. Using the difference between the integration values in the T/2-periods provides the function of the differentiating circuit 4 of FIG. 1. Specifically, using the integration values in the T/2-periods provides the low-pass filtering function of the differentiating circuit 4, and using the difference therebetween provides the differentiating function of the differentiating circuit 4. The three differential values are multiplied by a given coefficient "α" and the integration data BASE is added to the results of the multiplications, and thereby three differentiation/integration data SA[0], SA[1], and SA[2] are generated. The differentiation/integration data SA[0], SA[1], and SA[2] correspond to the output signals from the adding circuits 11, 12, and 13 of FIG. 1 respectively.

A step 208 following the step 207 compares the differentiation/integration data SA[0], SA[1], and SA[2] with predetermined threshold-value data STH[0], STH[1], and STH[2] respectively. The step 208 corresponds the comparing circuits 17, 18, and 19 of FIG. 1. When the value of the differentiation/integration data SA[0] exceeds the predetermined value of the threshold-value data STH[0], a collision of the vehicle is determined to be present and the program advances to a step 211. When the value of the differentiation/integration data SA[1] exceeds the predetermined value of the threshold-value data STH[1], a collision of the vehicle is determined to be present and the program advances to the step 211. When the value of the differentiation/integration data SA[2] exceeds the predetermined value of the threshold-value data STH[2], a collision of the vehicle is determined to be present and the program advances to the step 211. Otherwise, the program advances to a step 209 after the completion of the step 208.

The step 211 outputs a high-level signal (fire signal) to the switching transistor 21, so that the switching transistor 21 is turned on and thereby a trigger current is supplied to the squib 22 from the power supply. Thus, the squib 22 is activated, and the air bag 23 is inflated. After the step 211, the current execution cycle of the interruption process ends and the program returns to the main routine.

The step 209 increments the pointers SP[1] of the integration-value memorizing array S by 1, where i=1, 2, 3, 4, and 5. A step 210 following the step 209 outputs an instruction to the A/D converter 24 so that the A/D converter 24 should start the next A/D conversion. As a result, the A/D converter 24 executes the next A/D conversion of the acceleration signal. After the step 210, the current execution cycle of the interruption process ends and the program returns to the main routine.

Figure 6:
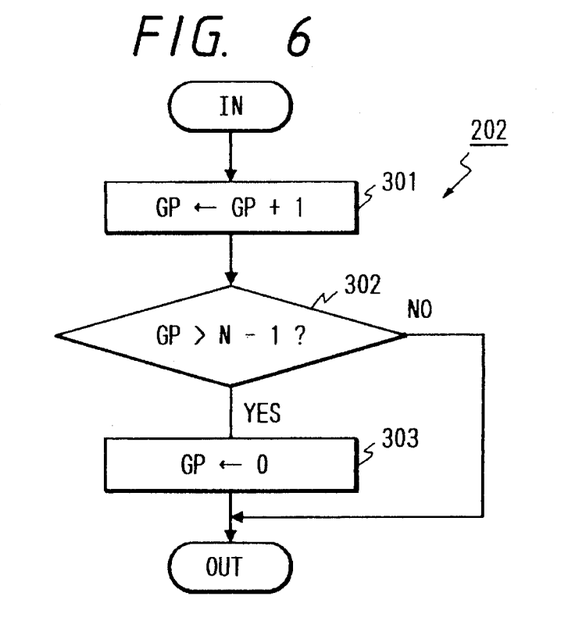
FIG. 6 is a flowchart of a process of incrementing a pointer GP.

The step 202 for incrementing the pointer GP has sub steps as will be indicated hereinafter. FIG. 6 shows the details of the internal design of the step 202. As shown in FIG. 6, the step 202 includes first and later sub steps 301,302, and 303. The first sub step 301 increments the pointer GP by 1. The sub step 302 following the sub step 301 determines whether or not the value of the pointer GP exceeds N−1. When the value of the pointer GP exceeds N−1, the program advances to the sub step 303. Otherwise, the program moves out of the step 202. The sub step 303 resets the pointer GP to 0. After the sub step 303, the program moves out of the step 202.

Figure 7:
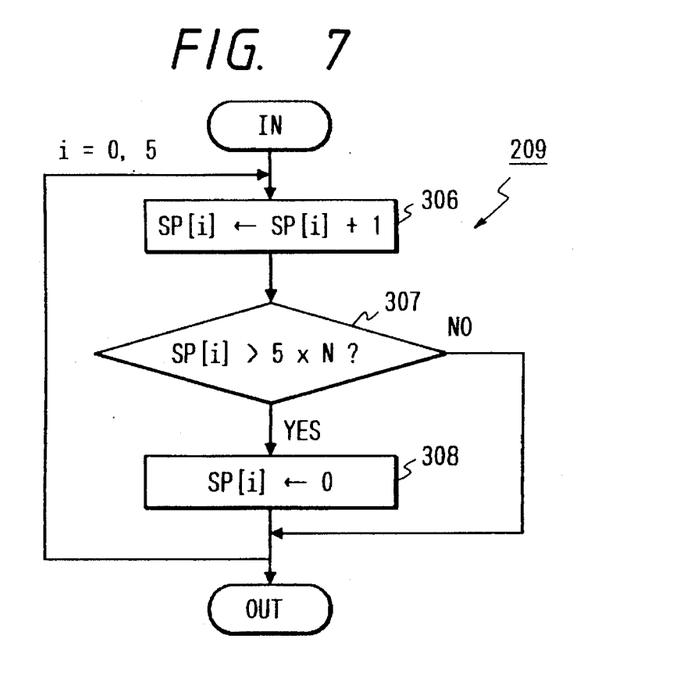
FIG. 7 is a flowchart of a process of incrementing pointers SP[i].

The step 209 for incrementing the pointers SP[i] has sub steps as will be indicated hereinafter. FIG. 7 shows the details of the internal design of the step 209. As shown in FIG. 7, the step 209 includes first and later sub steps 306, 307, and 308. The first sub step 306 increments the pointer SP[i] by 1. The sub step 307 following the sub step 306 determines whether or not the value of the pointer SP[i] exceeds 5×N. When the value of the pointer SP[i] exceeds 5×N, the program advances to the sub step 308. Otherwise, the program returns to the sub step 306 or moves out of the step 209. The sub step 308 resets the pointer SP[i] to 0. After the sub step 308, the program returns to the sub step 306 or moves out of the step 209. The above-mentioned procedure is reiterated for i=0, 1, . . . , 5.

It should be noted that this embodiment may be modified as follows. While the determination regarding a collision of the vehicle is executed on the basis of the value of the integration for 3T seconds at each moment corresponding to the boundary between the periods which result from equally dividing the T/2-second period into N portions in this embodiment, this invention may be designed so that this invention can be applied to the arrangement in which the determination of a collision of the vehicle is executed each time a given integration interval elapses as disclosed in Japanese published examined patent application 59-8574.

While the three differential values are calculated for each integration period in this embodiment, the number of the differential values may be different from three.

While the air bag is used as a safety apparatus in this embodiment, a seat belt passively actuated via a squib may be used as a safety apparatus. In addition, a combination of the air bag and the seat belt may be used as a safety apparatus.

What is claimed is:

1. A trigger device for a vehicle safety apparatus, comprising:

an acceleration sensor for detecting an acceleration of a vehicle and generating an electric acceleration signal representative thereof;

integration means for integrating the acceleration signal during each given integration period and generating an integration value representative of a result of the integrating;

determination means for determining whether or not a collision of the vehicle is present on a basis of the integration value generated by the integration means; and trigger means for triggering the vehicle safety apparatus when the determination means determines a collision of the vehicle to be present;

the determination means comprising:

means for dividing the integration period into divided portion;

differentiation means for detecting a respective differential value of the acceleration signal for each of the divided portions of the integration period, addition means for adding the respective differential values detected by the differentiation means and the integration value generated by the integration means, and for generating an addition value representative of a result of the adding, and sub-determination means for determining whether or not a collision of the vehicle is present on a basis of the addition value generated by the addition means.

2. A trigger device according to claim 1, further comprising means for sequentially shifting the integration period by a unit corresponding to each divided portion of the integration period, the integration means integrating over the sequentially shifted integration period.

3. The trigger device of claim 1, wherein the safety apparatus comprises an air bag.

4. The trigger device of claim 1, wherein the differentiation means, the addition means, and the sub-determination means comprise a microcomputer.

5. A trigger device for a vehicle safety apparatus, comprising:

an acceleration sensor for detecting an acceleration of a vehicle and generating an electric acceleration signal representative thereof;

integration means for integrating the acceleration signal during each given integration period and generating an integration value representative of a result of the integrating;

determination means for determining whether or not a collision of the vehicle is present on a basis of the integration value generated by the integration means; and trigger means for triggering the vehicle safety apparatus when the determination means determines a collision of the vehicle to be present;

the determination means comprising:

differentiation means for detecting a differential value of the acceleration signal which occurs at a given moment in the integration period, addition means for adding the differential value detected by the differentiation means and the integration value generated by the integration means, and for generating an addition value representative of a result of the adding, and sub-determination means for determining whether or not a collision of the vehicle is present on a basis of the addition value generated by the addition means, the sub-determination means comprising:

means for detecting first and second sub-differential values of the acceleration signal which occur at first and second different moments in the integration period respectively, means for adding the first sub-differential value and the integration value and generating a first sub-addition value representative of a result of the adding, means for adding the second sub-differential value and the integration value and generating a second sub-addition value representative of a result of the adding, and means for determining whether or not a collision of the vehicle is present on a basis of the first and second sub-addition values.

6. A trigger device for a vehicle safety apparatus, comprising:
an acceleration sensor for detecting an acceleration of a vehicle and generating an electric acceleration signal representative thereof;
integration means for integrating the acceleration signal during each given integration period and generating an integration value representative of a result of the integrating;
determination means for determining whether or not a collision of the vehicle is present on a basis of the integration value generated by the integration means; and
trigger means for triggering the vehicle safety apparatus when the determination means determines a collision of the vehicle to be present;
the determination means comprising:
differentiation means for detecting a differential value of the acceleration signal which occurs at a given moment in the integration period,
addition means for adding the differential value detected by the differentiation means and the integration value generated by the integration means, and for generating an addition value representative of a result of the adding, and
sub-determination means for determining whether or not a collision of the vehicle is present on a basis of the addition value generated by the addition means,
the differentiation means comprising:
means for dividing a portion of the integration period into halves,
means for detecting first and second values of the acceleration signal which occur in the halves of the portion of the integration period respectively,
means for executing a subtraction between the first and second values of the acceleration signal, and
means for generating the differential value of the acceleration signal on a basis of a result of the subtraction.

7. A trigger device for a vehicle safety apparatus, comprising:
an acceleration sensor for detecting an acceleration of a vehicle and generating an electric acceleration signal representative thereof;
integration means for integrating the acceleration signal during each given integration period and generating an integration value representative of a result of the integrating;
determination means for determining whether or not a collision of the vehicle is present on a basis of the integration value generated by the integration means; and
trigger means for triggering the vehicle safety apparatus when the determination means determines a collision of the vehicle to be present;
the determination means comprising:
differentiation means for detecting a differential value of the acceleration signal which occurs at a given moment in the integration period,
addition means for adding the differential value detected by the differentiation means and the integration value generated by the integration means, and for generating an addition value representative of a result of the adding, and
sub-determination means for determining whether or not a collision of the vehicle is present on a basis of the addition value generated by the addition means,
the sub-determination means comprising:
means for detecting first, second, and third sub-differential values of the acceleration signal which occur at first, second, and third different moments in the integration period respectively,
means for adding the first sub-differential value and the integration value and generating a first sub-addition value representative of a result of the adding,
means for adding the second sub-differential value and the integration value and generating a second sub-addition value representative of a result of the adding,
means for adding the third sub-differential value and the integration value and generating a third sub-addition value representative of a result of the adding, and
means for determining whether or not a collision of the vehicle is present on a basis of the first, second, and third sub-addition values.

8. A trigger device for a vehicle safety apparatus, comprising:
an acceleration sensor for detecting an acceleration of a vehicle and generating an electric acceleration signal representative thereof;
integration means for integrating the acceleration signal during each given integration period and generating an integration value representative of a result of the integrating;
first differentiation means for detecting a first differential value of the acceleration signal which occurs at a first moment in the integration period;
second differentiation means for detecting a second differential value of the acceleration signal which occurs at a second moment in the integration period, the second moment being different from the first moment;
first addition means for adding the integration value generated by the integration means and the first differential value detected by the first differentiation means, and for generating a first addition value representative of a result of the adding;
second addition means for adding the integration value generated by the integration means and the second differential value detected by the second differentiation means, and for generating a second addition value representative of a result of the adding;
first determination means for comparing the first addition value generated by the first addition means with a first reference value to determine whether or not a collision of the vehicle is present;
second determination means for comparing the second addition value generated by the second addition means with a second reference value to determine whether or not a collision of the vehicle is present; and
trigger means for triggering the vehicle safety apparatus when at least one of the first determination means and the second determination means determines a collision of the vehicle to be present.

9. The trigger device of claim 8, further comprising means for dividing the integration period into divided portions, and means for sequentially shifting the integration period by a unit corresponding to each divided portion.

10. The trigger device of claim 8, wherein each of the first differentiation means and the second differentiation means comprises means for dividing a portion of the integration period into halves, means for detecting first and second values of the acceleration signal which occur in the halves of the portion of the integration period respectively, means for executing a subtraction between the first and second values of the acceleration signal, and means for generating the differential value of the acceleration signal on the basis of a result of the subtraction.

11. The trigger device of claim 8, further comprising third differentiation means for detecting a third differential value of the acceleration signal which occurs at a third moment in the integration period, the third moment being different from the first moment and the second moment, third addition means for adding the integration value generated by the integration means and the third differential value detected by the third differentiation means, and for generating a third addition value representative of a result of the adding, and third determination means for comparing the third addition value generated by the third addition means with a third reference value to determine whether or not a collision of the vehicle is present, the trigger means being operative to trigger the vehicle safety apparatus when at least one of the first determination means, the second determination means, and the third determination means determines a collision of the vehicle to be present.

12. The trigger device of claim 8, wherein the safety apparatus comprises an air bag.

13. The trigger device of claim 8, wherein the integration means, the first differentiation means, the second differentiation means, the first addition means, the second addition means, the first determination means, and the second determination means comprise a microcomputer.

14. A trigger device for a vehicle safety apparatus, comprising:

an acceleration sensor for detecting an acceleration of a vehicle and generating an electric acceleration signal representative thereof;

a microcomputer for processing the acceleration signal and determining whether or not a collision of the vehicle is present on the basis of a result of the processing; and trigger means for triggering the vehicle safety apparatus when the microcomputer determines a collision of the vehicle to be present;

wherein the microcomputer comprises integration means for integrating the acceleration signal during each given integration period and generating an integration value representative of a result of the integrating, first differentiation means for detecting a first differential value of the acceleration signal which occurs at a first moment in the integration period, second differentiation means for detecting a second differential value of the acceleration signal which occurs at a second moment in the integration period, the second moment being different from the first moment, first addition means for adding the integration value generated by the integration means and the first differential value detected by the first differentiation means, and for generating a first addition value representative of a result of the adding, second addition means for adding the integration value generated by the integration means and the second differential value detected by the second differentiation means, and for generating a second addition value representative of a result of the adding, first determination means for comparing the first addition value generated by the first addition means with a first reference value to determine whether or not a collision of the vehicle is present, and second determination means for comparing the second addition value generated by the second addition means with a second reference value to determine whether or not a collision of the vehicle is present.

15. A trigger device for a vehicle safety apparatus, comprising:

an acceleration sensor for detecting an acceleration of a vehicle and generating an electric acceleration signal representative thereof;

integration means for integrating the acceleration signal and generating an integration value representative of a result of the integrating;

first differentiation means for detecting a first value of a differential of the acceleration signal which occurs at a first moment;

second differentiation means for detecting a second value of a differential of the acceleration signal which occurs at a second moment, the second moment preceding the first moment;

determination means for determining whether or not a collision of the vehicle is present on the basis of the integration value generated by the integrating means, the first differential value detected by the first differentiation means, and the second differential value detected by the second differentiation means; and trigger means for triggering the vehicle safety apparatus when the determination means determines a collision of the vehicle to be present.

16. The trigger device of claim 15, wherein the second differentiation means comprises means for delaying an output signal of the first differentiation means.

17. A trigger device for a vehicle safety apparatus, comprising:

an acceleration sensor for detecting an acceleration of a vehicle and generating an electric acceleration signal representative thereof;

integration means for integrating the acceleration signal during each given integration period and generating an integration value representative of a result of the integrating;

determination means for performing a determination regarding a collision of the vehicle on a basis of the integration value generated by the integration means; and trigger means for triggering the vehicle safety apparatus in response to a result of the determination by the determining means;

the determination means comprising:
means for dividing the integration period into divided portions;
differentiation means for detecting a respective differential value of the acceleration signal for each of the divided portions of the integration period,
addition means for adding the respective differential values detected by the differentiation means and the integration value generated by the integration means, and for generating an addition value representative of a result of the adding, and
sub-determination means for determining a condition of the collision of the vehicle on a basis of the addition value generated by the addition means.

18. A trigger device for a vehicle safety apparatus according to claim 17, wherein the sub-determination means comprises:

means for detecting first and second sub-differential values of the acceleration signal which occur at first and second different divided portions of the integration period respectively;

means for adding the first sub-differential value and the integration value and generating a first sub-addition value representative of a result of the adding, means for adding the second sub-differential value and the integration value and generating a second sub-addition value representative of a result of the adding, and means for determining the condition of the collision of the vehicle on a basis of the first and second sub-addition values.

19. A trigger device for a vehicle safety apparatus according to claim 17, further comprising means for sequentially shifting the integration period by a unit corresponding to each divided portion of the integration period, the integration means integrating over the sequentially shifted integration period.

20. A trigger device for a vehicle safety apparatus according to claim 17, wherein the sub-determination means comprises means for detecting first, second, and third sub-differential values of the acceleration signal which occur during first, second, and third different divided portions of the integration period respectively;

means for adding the first sub-differential value and the integration value and generating a first sub-addition value representative of a result of the adding;

means for adding the second sub-differential value and the integration value and generating a second sub-addition value representative of a result of the adding;

means for adding the third sub-differential value and the integration value and generating a third sub-addition value representative of a result of the adding; and means for determining the condition of the collision of the vehicle on a basis of the first, second, and third sub-addition values.

21. A trigger device for a vehicle safety apparatus according to claim 17, wherein the safety apparatus comprises an air bag.

22. A trigger device for a vehicle safety apparatus according to claim 17, wherein the differentiation means, the addition means, and the sub-determination means comprise a microcomputer.

23. A trigger device for a vehicle safety apparatus comprising:

an acceleration sensor for detecting an acceleration of a vehicle and generating an electric acceleration signal representative thereof;

integration means for integrating the acceleration signal during each given integration period and generating an integration value representative of a result of the integrating;

determination means for performing a determination regarding a collision of the vehicle on a basis of the integration value generated by the integration means; and trigger means for triggering the vehicle safety apparatus in response to a result of the determination by the determining means;

the determination means comprising:

differentiation means for detecting a differential value of the acceleration signal which occurs at a given moment in the integration period, the differentiation means comprising:

means for dividing a portion of the integration period into halves;

means for detecting first and second values of the acceleration signal which occur in the halves of the portion of the integration period respectively;

means for executing a subtraction between the first and second values of the acceleration signal; and means for generating the differential value of the acceleration signal on a basis of a result of the subtraction, addition means for adding the differential values detected by the differentiation means and the integration value generated by the integration means, and for generating an addition value representative of a result of the adding, and sub-determination means for determining a condition of the collision of the vehicle on a basis of the addition value generated by the addition means.

* * * * *